A. G. SCHINDLER.
AUTOMOBILE BRAKE ATTACHMENT.
APPLICATION FILED MAY 21, 1920.

1,383,490.

Patented July 5, 1921.

INVENTOR:
ADOLPH G. SCHINDLER
BY his ATTORNEY:
A. M. Carlsen.

UNITED STATES PATENT OFFICE.

ADOLPH G. SCHINDLER, OF STILLWATER, MINNESOTA.

AUTOMOBILE-BRAKE ATTACHMENT.

1,383,490.     Specification of Letters Patent.     Patented July 5, 1921.

Application filed May 21, 1920. Serial No. 383,150.

*To all whom it may concern:*

Be it known that I, ADOLPH G. SCHINDLER, a citizen of the United States, residing at Stillwater, in the county of Washington and State of Minnesota, have invented a new and useful Automobile-Brake Attachment, of which the following is a specification.

My invention relates to brakes of automobiles and other auto-vehicles; and the object is to provide such brakes with an attachment as means for taking up the lost motion caused by the wear of the brake shoes and their adjacent parts.

Figure 1:
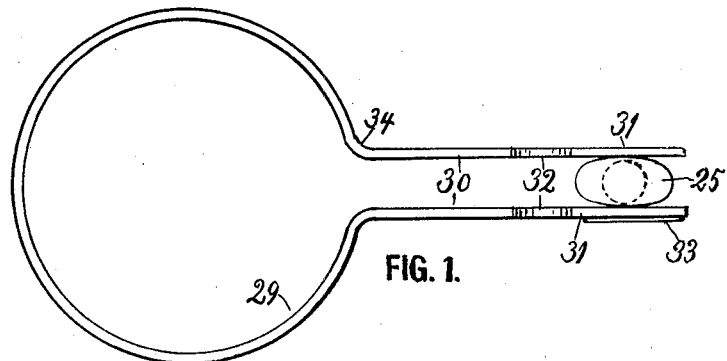
Figure 2:
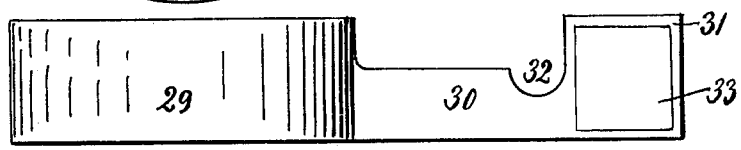
Figure 3:
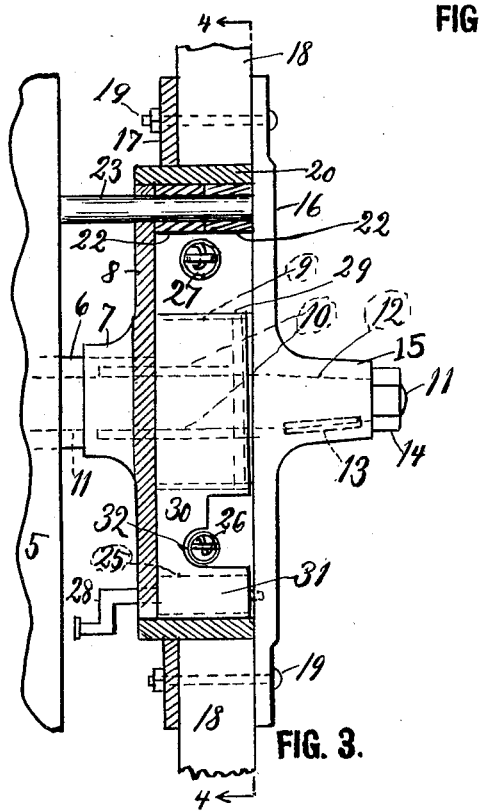
Figure 4:
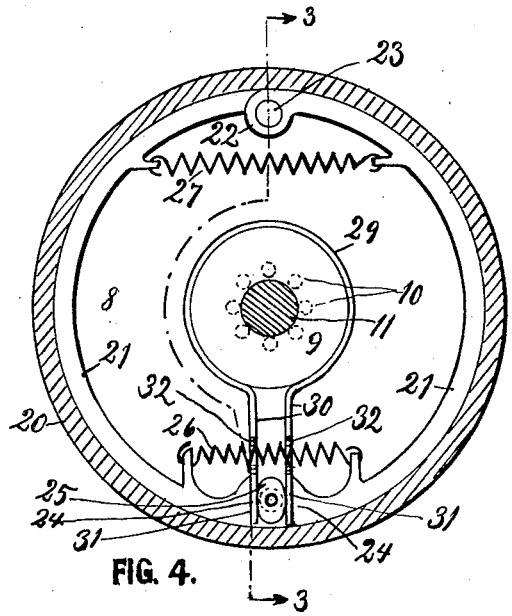

In the accompanying drawing:

Figure 1 is a plan view of the attachment alone and the operating cam of one of the brakes. Fig. 2 is an edge view of Fig. 1 with the cam omitted and a modifying improvement added. Fig. 3 is a section on the line 3—3 in Fig. 4, showing the attachment applied in the hub of an automobile ground wheel. Fig. 4 is a section on the line 4—4 in Fig. 3.

Referring to the drawing by reference numerals, 5 designates a small portion of one side of the body of an auto vehicle, from under which projects the usual sleeve 6 of the differential gear casing, to which sleeve is fixed the usual hub 7 with the disk 8 carrying an internal hub portion, 9, and in which hub, 7—9, is journaled in roller bearings 10 the rear axle 11 of the vehicle.

Secured upon the skein 12 of said axle, by a key 13 and a nut 14, is the hub 15 of the traction wheel. Said hub is provided with a disk 16, between which and a ring 17 the wooden spokes 18 are secured by bolts 19. The inner ends of the spokes abut against a cylindrical rim 20, which is cast integral with the disk 16 and with it forms a casing which rotates snugly about the disk 8.

Fitted within the casing 20 are two semicircular brake shoes 21, which have their ends 22 overlapped and pivoted on a stud 23, which may be fixed either in the frame work of the vehicle or in the disk 8 through which it extends. The other ends of the brake shoes are formed with normally parallel faces 24, between which a cam 25 operates to spread the brake shoes against the resistance of springs 26, 27 whenever the cam is operated by its crank shaft 28 and the usual rod and brake lever (not shown); said parts are the same at both sides of the vehicle but the operating rods are usually connected to a single brake lever.

The attachment consists of a flat ring or loop 29, which is placed loosely upon the internal hub 9, which holds it in central position, and it is wide enough to be held in position against edgewise displacement, by the flanges 8 and 16. The ends of the loop constitute two normally parallel arms, 30, whose end portions 31 extend between the cam 25 and the adjacent faces 24 of the brake shoes. Said arms are provided with clearances 32 for the spring 26.

The attachment is made of sheet or band metal of different thickness. Hence in the use of the device, when the brake levers commence to swing too far before the brakes will work, or the cams 25 will turn more than ninety degrees, one of the attachments of thin metal is placed as shown in Fig. 4, so as to take up the wear of the cam, the faces 24, and the periphery of the brake shoes. When the brake gets further worn, a thicker lining or attachment 29—31 is substituted for the first one. Or, where it is more convenient to do so, a thin plate 33 may be soldered onto one or both of the arm portions 31; or, solder alone may be applied to the part or parts 31 at their outer sides, where there is no friction to wear it away. In the very simplest form of the device only one arm 30 is used, the other arm may be cut away at the point 34 in Fig. 1.

What I claim is:—

1. The combination with a spreading brake in the wheel hub of an auto vehicle, of a cam for spreading the brake into braking position, and a device of flat metal detachably secured to the hub and projecting as a lining between the cam and the brake.

2. In an auto vehicle, a fixed hub, a driven axle journaled in said hub, a ground wheel fixed on the axle and having a hollow cylindrical hub spaced about the fixed hub, two semi-circular non-rotatable brake shoes mounted on the fixed hub, springs holding the brake shoes normally idle, a cam arranged to act between the swinging ends of the brake shoes to spread them against the inner face of the hollow hub; a loop of flat metal embracing loosely the fixed hub and having its ends formed into parallel arms extending at opposite sides of the cam, between it and the adjacent faces of the brake shoes.

3. The structure specified in claim 2, said springs being contracting coil springs, and the arms of the attachment having clearance notches where one of said springs crosses the arms.

In testimony whereof I affix my signature.

ADOLPH G. SCHINDLER.